United States Patent [19]
Blakeslee et al.

[11] Patent Number: 5,481,501
[45] Date of Patent: Jan. 2, 1996

[54] METHOD FOR SIMULATING CROSSWELL SEISMIC DATA

[75] Inventors: Samuel N. Blakeslee; Sen-Tsuen Chen, both of Sugar Land, Tex.

[73] Assignee: Exxon Production Research Company, Houston, Tex.

[21] Appl. No.: 19,501

[22] Filed: Feb. 19, 1993

[51] Int. Cl.$^6$ .................................. G01V 1/28; G01V 1/36
[52] U.S. Cl. ............................... 367/57; 367/75; 364/422
[58] Field of Search ................................ 367/21, 57, 73, 367/75; 364/421, 422

[56] References Cited

U.S. PATENT DOCUMENTS

| | | | |
|---|---|---|---|
| 2,992,694 | 7/1961 | Musgrave et al. | 367/57 |
| 4,214,226 | 7/1980 | Narasimhan et al. | 367/27 |
| 4,751,688 | 6/1988 | Paulsson | 367/36 |
| 4,856,614 | 8/1989 | Arens et al. | 181/104 |
| 4,893,694 | 1/1990 | Houck | 367/57 |
| 5,042,611 | 8/1991 | Howlett | 181/104 |
| 5,062,086 | 10/1991 | Harlan et al. | 367/73 |
| 5,142,500 | 8/1992 | Yamamoto et al. | 367/57 |
| 5,144,590 | 9/1992 | Chon | 367/57 |
| 5,339,282 | 8/1994 | Kuhn et al. | 367/7 |

OTHER PUBLICATIONS

Michelbra et al., 2nd Soc. Explor. Geophys. Japan et al. Geo. Int. Symp, v–2, pp. 77–96, Nov. 1992; Abst. herewith.
Guest et al., Soh Natur. Sci. Eng. Res. Counelan et al., May 17, 1992, Canad Jour. Exp. Phys., vol. 29, #1, pp. 78–92.
Blakeslee, S.; Leading Edge, vol. 13, #4, pp. 252–254, Apr. 1994; Abst. only herewith.
Blakeslee et al.; 63rd Ann. SEG Int. Mtg. Sep. 26, 1993, pp. 9–12; Abst. only herewith.
Squires et al., Geophysics, vol. 57, #2, Feb. 1992, pp. 353–362.
Deplante et al, 56th Annu. Soc. Explor. Geophys. Int Mtg., Nov. 2, 1986, Pap. S146; Geophysics, vol. 52, #3, pp. 433, Mar. 1987.
Sheriff, "Encyclopedic Dictionary of Exploration Geophysics", Second Edition, p. 89.
Bregman et al., "Crosshole Seismic Tomography", Geophysics, vol. 54, No. 2 (Feb. 1989); pp. 200–215.
Lines et al., "Integrated Interpretation of Borehole and Crosswell Data From a West Texas Field", The Leading Edge, Jan. 1993; pp. 13–16.
Cerveny, "Ray Tracing Algorithms in Three–Dimensional Laterally Varying Layered Structures", Chapter 5 of *Seismic Tomography: With Applications in Global Seismology and Exploration Geophysics*, edited by G. Nolet, D. Reidel Publishing Company, 1987.

*Primary Examiner*—Nelson Moskowitz
*Attorney, Agent, or Firm*—Keith A. Bell

[57] ABSTRACT

A method for simulating crosswell seismic data between first and second spaced apart wells is disclosed. According to the invention, a surface seismic source is used to generate a seismic signal at a location on the surface of the earth substantially in line with, but not between, the wells and closer to the first well than to the second well. A plurality of downhole seismic receivers are located in the first well and at least one downhole seismic receiver is located in the second well. The actual arrival time of the seismic signal at each of the first well and second well seismic receivers is recorded. For each second well seismic receiver, the actual arrival time is then compared to an estimate of the seismic signal travel time calculated on the basis of an assumed interwell seismic velocity field. If the estimate of the seismic signal travel time is not equal to the actual arrival time for each second well seismic receiver, the assumed interwell seismic velocity field is modified and the calculation is repeated. In this manner, the actual interwell seismic velocity field can be determined.

33 Claims, 1 Drawing Sheet

METHOD FOR SIMULATING CROSSWELL SEISMIC DATA

FIELD OF THE INVENTION

This invention relates to the field of crosswell seismic tomography. More particularly, but not by way of limitation, the invention pertains to a method for simulating crosswell seismic data using surface seismic sources and downhole seismic receivers.

BACKGROUND OF THE INVENTION

Crosswell seismic tomography is a recently developed technology which permits the structure of the subsurface formations between two spaced apart wells to be accurately determined. Generally, a downhole seismic source is placed in a first well and a plurality of downhole seismic receivers are placed in a second well. The seismic source in the first well is then activated to generate a seismic signal which propagates through the subsurface formations to the seismic receivers in the second well where it is recorded. Typically, the seismic source is then moved vertically downwardly or upwardly in the first well and reactivated, and the resulting seismic signal is again recorded by the seismic receivers in the second well. This procedure is repeated until seismic data covering the entire interwell region of interest has been generated. The resulting seismic data may be processed to yield information on the subsurface formations through which the seismic signals passed. U.S. Pat. No. 4,214,226 issued Jul. 22, 1980 to Narasimhan et al. provides a general description of crosswell seismic tomography.

Crosswell seismic tomography has a number of potential uses in the oil and gas industry. For example, crosswell seismic data may be used to determine the interwell seismic velocity and absorption fields. This information may then be used to determine reservoir characteristics, estimate reservoir properties, and monitor the effectiveness of enhanced oil recovery processes. Other potential uses of crosswell seismic data will be well known to those skilled in the art.

A number of downhole seismic sources have been developed to enable the acquisition of crosswell seismic data, including downhole vibrators, resonators, explosive sources, piezoelectric transducers, magnetostrictive transducers, implosive sources, downhole airguns, and sparkers. All of these downhole seismic sources, however, must be designed to ensure that they do not damage the wellbore, which places strict upper limits on their power output and, accordingly, on the strength of the resulting seismic signals. This limitation restricts utilization of crosswell seismic tomography to situations in which the interwell distance is relatively short (i.e., no more than about 1,000 feet).

Another limitation on the use of crosswell seismic tomography is the substantial costs associated with preparing the wells for deployment of downhole seismic sources and receivers. In most cases, the diameters of the downhole seismic sources and receivers are too large to fit into the production tubing used to convey fluids from the reservoir to the surface. Therefore, at most sites, the production tubing must first be removed from the wells in order to conduct a crosswell survey and then be reinstalled following completion of the survey. This is a time-consuming and expensive process. It should be noted that recently a new type of intra-tubing hydrophone has been developed which may eliminate the need to remove the production tubing from the well in which the downhole seismic receivers are located. One example of such an intra-tubing hydrophone is the slim hole hydrophone array developed by Innovative Technologies Inc. of Houston, Tex. Nevertheless, in order to conduct a conventional crosswell survey it will still be necessary to remove the production tubing from the well in which the downhole seismic source is located.

From the foregoing, it can be seen that there is a need for a method of acquiring crosswell seismic data in which the strength of the seismic signal can be increased without fear of damaging the wellbore. There is also a need for a method of acquiring crosswell seismic data which avoids the necessity of removing the production tubing from the wellbores. The present invention satisfies these needs.

SUMMARY OF THE INVENTION

The present invention overcomes the above-described limitations of conventional crosswell surveys by eliminating the downhole seismic source. Rather, the invention utilizes a surface seismic source and downhole seismic receivers in both the first and second wells to simulate conventional crosswell data. The surface seismic source is located substantially in line with, but not between, the wells, and closer to the first well than to the second well. The surface source is activated and the actual arrival time of the resulting seismic signal at each of the first well and second well seismic receivers is recorded. For each second well seismic receiver, the actual arrival time of the seismic signal is then compared to an estimate of the seismic signal travel time from the surface seismic source to the second well seismic receiver. The estimate is calculated on the basis of an assumed interwell seismic velocity field. If the assumed interwell seismic velocity field is accurate, the actual arrival time of the seismic signal will be approximately equal to the estimate of the seismic signal travel time for all second well seismic receivers. If the actual arrival time is not approximately equal to the estimate for all second well receivers, then the interwell seismic velocity field is modified and a new estimate is calculated. This process is repeated until the correct interwell seismic velocity field is determined.

The estimate of the seismic signal travel time from the surface seismic source to a particular second well seismic receiver is determined by calculating a plurality of possible travel times, each of which is the sum of (a) the actual arrival time of the seismic signal at a selected one of the first well seismic receivers and (b) the theoretical seismic signal travel time between the selected first well receiver and the particular second well seismic receiver based on the assumed interwell seismic velocity field. Based on Fermat's principle, the shortest of the plurality of possible travel times is then selected as the estimate of the seismic signal travel time from the surface seismic source to the particular second well seismic receiver.

Preferably, seismic signals are generated on both sides of, but not between, the two wells so that simulated crosswell data may be obtained for the entire interwell region. The invention may be used for both on land and offshore operations. Also, any type of land or marine seismic source may be used to generate the seismic signals, and any type of downhole seismic receiver may be used to record the signal arrivals. However, the invention is especially useful in connection with a slim hole seismic receiver which can be used without removing the production tubing from the well.

BRIEF DESCRIPTION OF THE DRAWINGS

The present invention and its advantages will be better understood by referring to the following detailed description and the attached drawings in which.

Figure 1:
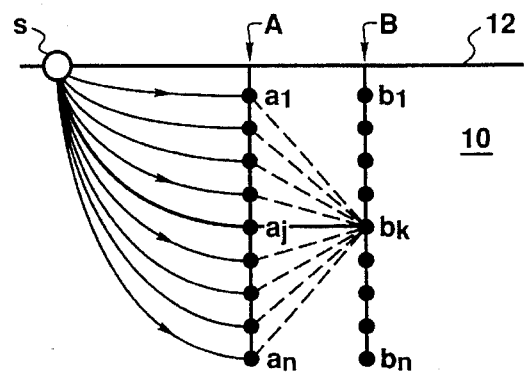
FIGS. 1 and 2 schematically illustrate the present invention for simulating crosswell seismic data between wells A and B, with the seismic source s being closer to well A in FIG. 1 and closer to well B in FIG. 2.

While the invention will be described in connection with its preferred embodiments, it will be understood that the invention is not limited thereto. On the contrary, it is intended to cover all alternatives, modifications, and equivalents which may be included within the spirit and scope of the invention, as defined by the appended claims.

DETAILED DESCRIPTION OF THE PREFERRED EMBODIMENTS

The present invention in a method for simulating crosswell seismic data between a first well and a second well using surface seismic sources and downhole seismic receivers. In a first embodiment of the invention, a seismic source is located on the surface of the earth, substantially in line with, but not between, the two wells. The seismic source is closer to the first well than to the second well. A plurality of vertically spaced apart downhole seismic receivers are placed in the first well, and at least one downhole seismic receiver is placed in the second well. The surface seismic source is then activated, and the actual arrival time of the resulting seismic signal at each of the first well and second well seismic receivers is recorded. The actual arrival time of the seismic signal at each of the second well seismic receivers is then compared with a theoretical estimate of the seismic signal travel time from the surface seismic source to the second well seismic receiver. This theoretical estimate is calculated on the basis of an assumed interwell seismic velocity field, as more fully described below. If the theoretical estimate of the seismic signal travel time is not approximately equal to the actual arrival time, the assumed interwell seismic velocity field is adjusted and a new theoretical estimate of the seismic signal travel time is calculated. This process is repeated until the theoretical estimate of the seismic signal travel time is approximately equal to the actual travel time for all of the second well seismic receivers.

In a second embodiment of the invention, a plurality of vertically spaced apart downhole seismic receivers are placed in each of the first and second wells, and seismic signals are generated at surface locations in line with and on both sides of, but not between, the wells. In this manner, crosswell seismic data can be simulated for the entire interwell region.

It will be understood by those skilled in the art that the present invention is applicable to both on land and offshore operations. Any type of on land or marine seismic source may be used to generate the seismic signals. It will be further understood that for on land operations the seismic source is often buried a distance (e.g., up to 100 feet or more) below the actual surface of the earth so that the seismic signal is generated below the weathered surface layers of earth which can greatly attenuate seismic signals. All such seismic sources are within the scope of the present invention.

The present invention has a number of advantages over prior methods for acquiring crosswell seismic data. For example, use of surface seismic sources eliminates the possibility of damaging the wellbore. This permits the use of very powerful seismic sources, thereby substantially increasing the interwell distance for which crosswell seismic data may be obtained. Also, since the possibility of damaging the wellbore has been eliminated, crosswell data may be obtained for wells having poor quality casings where the risk of damage from a conventional crosswell survey is significant. Another advantage of the invention is that use of surface seismic sources in conjunction with the new intra-tubing hydrophones discussed above eliminates the need to remove the production tubing from either of the wells. This substantially reduces the cost of and time required for conducting a crosswell survey. These and other advantages of the invention will be apparent to those skilled in the art based on the teachings set forth herein. To the extent the following description is specific to a particular embodiment or a particular use of the invention, this is intended to be by way of illustration and not by way of limitation.

Turning now to FIG. 1, two wells, well A and well B, are illustrated extending downwardly into the earth 10. A seismic source s is located on the surface 12 of the earth 10, substantially in line with, but not between, wells A and B and closer to well A than to well B. A plurality of downhole seismic receivers, $a_1$ through $a_n$, are vertically spaced apart in well A. Preferably, a plurality of downhole seismic receivers, $b_1$ through $b_n$, are vertically spaced apart in well B. However, it will be understood by those skilled in the art that the present invention requires only a single downhole seismic receiver in well B. It should be noted that the surface seismic source s need not be exactly in line with wells A and B. Errors resulting from angular deviations of up to about 15° will be relatively small.

In order to simulate crosswell data between well A and B, the seismic source s is activated to generate a seismic signal which propagates through the subsurface formations and is recorded by each of the first well seismic receivers $a_1$ through $a_n$ and each of the second well seismic receivers $b_1$ through $b_n$. The resulting seismic data is then processed as described below to yield information regarding the interwell region between wells A and B.

Let $a_j$ be the $j^{th}$ seismic receiver in well A and $b_k$ be the $k^{th}$ seismic receiver in well B. The seismic ray that originates at seismic source s and travels to seismic receiver $b_k$ will intersect well A at some unknown depth before reaching well B (assuming of course that well A is sufficiently deep with respect to the depth of seismic receiver $b_k$). It will be understood by those skilled in the art that the depth at which the seismic ray intersects well A is unknown because seismic rays in the subsurface do not travel in straight lines. Rather, the seismic rays are bent and refracted as they travel through different materials having varying densities and sonic velocities.

In FIG. 1, the seismic rays between the surface seismic source s and each of the first well seismic receivers $a_1$ through $a_n$ are represented as curved. This is because the actual raypaths are unknown, for the reason stated above. However, the actual raypaths are unimportant to the present invention. As more fully described below, all that is needed for the present invention is the actual arrival time of the seismic signal at each of the first well seismic receivers. The actual raypath taken is irrelevant.

According to the method of the present invention, an interwell seismic velocity field for the region between well A and well B is assumed. Based on the assumed interwell seismic velocity field, theoretical seismic signal travel times are computed from each of the seismic receivers in well A, $a_1$ through $a_n$, to the selected seismic receiver in well B, $b_k$. Those theoretical crosswell travel times, $C_{j,k}$, are then added to the observed actual arrival times of the seismic signal at the seismic receivers in well A, $A_j$, to yield n estimates of the seismic signal travel time, $T_{j,k}$, from the surface source s to receiver $b_k$ according to the following equation:

$$T_{j,k}=A_j+C_{j,k}$$

Those skilled in the art will be familiar with Fermat's principle which states that "the seismic raypath between two points is that for which the first-order variation of travel time with respect to all neighboring paths is zero." See e.g., R. E. Sheriff, Encyclopedic Dictionary of Exploration Geophysics, Second Edition, p. 89. In other words, the actual seismic raypath is the raypath for which the travel time is a minimum compared with all neighboring raypaths. Assuming Fermat's principle holds, $t_k$, the minimum value of $T_{j,k}$ is chosen as the best estimate of the ray's actual travel time from the surface source s to receiver $b_k$:

$$t_k = \min(T_{j,k})|_{j=1,n}$$

This also yields $a_j$, the receiver position in well A through which the ray passed while propagating to receiver $b_k$.

If the estimate of the interwell seismic velocity field is correct, then Fermat's principal will produce the correct end points, raypaths, and travel times for the ray. Any difference between $t_k$ and the actual arrival time of the seismic signal at receiver $b_k$ is due to errors in the assumed interwell seismic velocity field. Thus, the actual arrival times of the seismic signal at the receivers in well A and well B can be used to verify the accuracy of the assumed interwell seismic velocity field. If $t_k$ is not approximately equal to the actual arrival time at $b_k$, then the estimate of the interwell seismic velocity field is modified and the calculation is repeated until the theoretical estimate of seismic signal travel time is approximately equal to the actual arrival time of the seismic signal at all of the second well receivers, $b_1$ through $b_n$. As is well known in the art, an iterative procedure is typically used to solve for the interwell seismic velocity field, as more fully described in the implementation section below. In other words, the output of the last tomographic inversion would be used as the velocity estimate to recalculate the raypaths between the two wells, thereby providing an updated and improved calculation of the correct interwell raypath and travel time.

The calculation of travel times and raypaths between the two wells can be performed in a number of different ways, including but not limited to ray tracing using shooting methods, ray tracing using fixed point ray bending, wave equation based forward modeling, and finite difference solutions to the eikonal equation. Further, the procedure described above can be extended beyond simple ray tracing techniques to wavefront mapping methods such as the finite difference solution to the eikonal equation or wave-equation modeling. In both of those cases, the measured wavefront at well A is used as a boundary condition which allows the wavefront at well B to be calculated. Since all of these methods are well known to those skilled in the art, they will not be further discussed herein.

The foregoing procedure can be repeated for all of the other receivers in well B, producing a suite of crosswell raypaths for a single seismic source s at the surface. Moving the source position and repeating the procedure results in a complete set of crosswell paths and travel times for simulated sources in well A shooting into receivers in well B.

Figure 2:
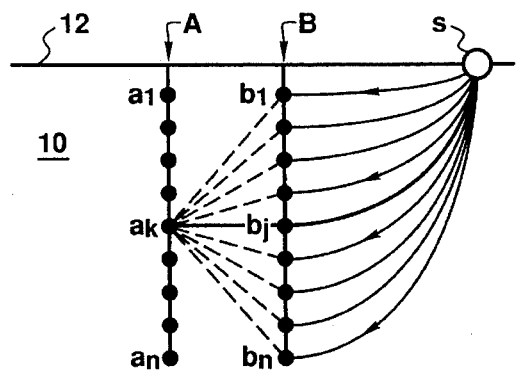

Referring now to FIG. 2, it can be seen that by switching the geometry so that the seismic source s is closer to well B than to well A, a complete set of crosswell paths and travel times for simulated sources in well B shooting into receivers in well A can be generated. This, in combination with the data previously developed, results in complete crosswell raypath coverage of the interwell region.

As described above, the present invention preferably utilizes the "first arrival" of the seismic signal for calculating the interwell velocity field. This first arrival in generally known as the "pressure-wave" or "P"-wave" arrival. However, it will be understood by those skilled in the art that the present invention may also be used with other arrivals, such as the "shear-wave" or "S-wave" arrival to yield other information relating to the interwell region.

Figure 3:
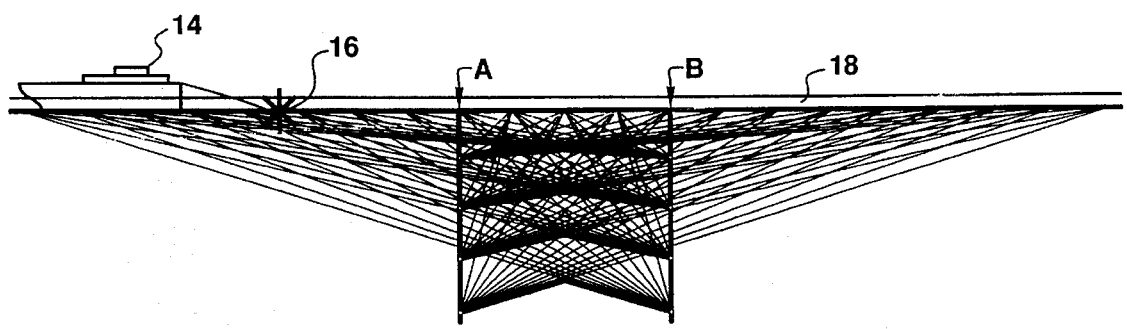
FIG. 3 schematically illustrates the use of the present invention for offshore operations.

As illustrated in FIG. 3, the method of the present invention may be utilized for offshore seismic operations as well as on land seismic operations. A vessel 14 would be used to tow a conventional marine seismic source 16 in a body of water 18 along a pathway substantially in line with wells A and B. As described above in connection with FIGS. 1 and 2, a plurality of downhole seismic receivers would preferably be located in each of the wells. The seismic source would be activated at spaced intervals along the pathway and the actual arrivals at each downhole receiver would be recorded. This data may then be processed according to the method outlined above to yield simulated crosswell data for the region between wells A and B.

The simulated crosswell data resulting from the present invention can be used in the same ways that actual crosswell data is used. For example, crosswell data may be used to determine both the P-wave and S-wave interwell seismic velocity fields from which various properties of the interwell medium (e.g., porosity) can be inferred. The amplitudes of the seismic signals recorded at $a_j$ and $b_k$ (see FIG. 1) may be compared to give information on the interwell absorptiveness ($a_j$ is the first well seismic receiver through which the seismic ray passed in traveling from the surface source s to the second well seismic receiver $b_k$). Another potential use of simulated crosswell data is to determine the interwell anisotropy field; however, this would require use of geophones rather than hydrophones as the downhole seismic receivers and would probably work best with oriented shear wave vibrators as the surface seismic sources. Still another potential use of simulated crosswell data is to monitor interwell reservoir changes associated with production. This would be done by repeating the crosswell survey after some production has occurred and comparing the results to those of previous surveys.

The method for simulating crosswell seismic data described herein will likely be most effective at locations where the interwell seismic velocity field varies slowly and increases with depth. This will allow the entire interwell medium to be covered with raypaths similar to those found using actual downhole seismic sources. Further, preferably the downhole seismic receivers can be placed both above and below the zone of interest to ensure full coverage.

One of the primary advantages of the present invention is that any type of surface seismic source may be used. In on land operations, powerful surface vibrators or explosives may be used. In offshore operations, arrays of air guns or water guns may be used to create a powerful seismic signal, as is well known in the art. This ability to use high power seismic sources overcomes the primary limitation of prior systems for generating crosswell seismic data, the danger of damage to the wellbore, and greatly extends the interwell distance for which crosswell data can effectively be obtained. Another advantage of the invention is that any type of downhole seismic receiver, such as a hydrophone or a geophone, may be used. Still another advantage of the invention is that use of surface seismic sources and the new intra-tubing hydrophones described above eliminates the need to remove the production tubing from either of the wells. This substantially reduces the cost of conducting a crosswell survey.

The invention described herein has many variations and extensions. For example, as described above, wells A and B are straight, substantially vertical wells. However, the invention may also be used in connection with deviated wells, so long as they are substantially coplanar. It will be apparent to those skilled in the art that modifying the invention to calculate the interwell velocity field between deviated wells is simply a matter of varying the mathematics on the basis of the geometry of the wells. It is also possible that the invention could be used with non-coplanar well geometries although this may reduce the accuracy of the resulting interwell seismic velocity field.

It will be apparent to those skilled in the art that the actual arrival time data need not be acquired simultaneously in both wells. For example, a dense walkaway vertical seismic profile or "VSP" (i.e., a VSP which uses many in line seismic source positions and many downhole seismic receiver positions) can be taken in the first well at one point in time, and later, when the second well is drilled, a second walkaway VSP can be taken in the second well. So long as the two walkway lines are substantially colinear, the resulting data can be used as described above to simulate crosswell data. This staged data acquisition can substantially reduce the cost and logistics associated with conducting the survey.

The present invention may be used in conjunction with actual crosswell data in a hybrid approach. Nearly horizontal seismic rays, which may require relatively large seismic source offsets at the surface, can be collected with actual downhole sources while steep angle rays can be collected with surface sources. This hybrid approach may be of value in regions where the vertical seismic velocity gradient is too gradual to bend rays such that they travel horizontally between the wells.

Conversely, the invention may also be used on conjunction with standard VSP data. Nearly vertical seismic rays, which are too steep to intersect both wells, can be collected with surface sources located between the wells. This hybrid approach could be of value in regions where the crosswell distance is so large that only rays traveling approximately horizontally intersect both wells.

It is also possible that the present invention could be reversed with the seismic sources being located downhole and the seismic receivers on the surface. However, in order for this to be practical, slim hole, high power downhole seismic sources need to be developed.

IMPLEMENTATION

Implementation of the present method for simulating crosswell seismic data will now be described. Assume two wells, well A and well B, with an array of seismic sources located on the surface of the earth, in line with, but not between, well A and well B and closer to well A than to well B. A plurality of downhole seismic receivers are located in each of the wells. The seismic sources are then activated individually, and the direct arrivals of the resulting seismic signals are recorded at the downhole seismic receivers in well A and well B. The resulting data is then processed as follows:

1. Pick the observed direct arrival travel times for each receiver in well B.
2. Pick the observed direct arrival travel times for each receiver in well A.
3. Estimate the interwell seismic velocity field.
4. Select a source on the surface.
5. Select a receiver in well B.
6. Calculate the raypaths and travel times from the selected receiver in well B to each receiver in well A.
7. Create a suite of composite travel times for the selected receiver in well B to the selected surface source by adding interwell raytraced travel times to the observed travel times from surface source to each of the receivers in well A.
8. Identify the minimum composite travel time as the true travel time from the selected surface source to the selected receiver in well B and identify the receiver in well A that is associated with the true travel time.
9. Define the observed crosswell travel time as the difference between the observed travel time of the selected receiver in well B and the observed travel time of the receiver in well A that was identified in the previous step.
10. Define the error as the difference between the observed crosswell travel time and the raytraced crosswell travel time.
11. Store the error and the raypath for the receiver pair.
12. Repeat steps 5–11 for each receiver in well B.
13. Repeat steps 4–12 for each source on the surface.
14. Include sources on the opposite side of the well pair by repeating steps 1–13, redefining what had been well A as well B and what had been well B as well A.
15. Invert all of the error and raypath information stored in step 11 to improve the estimate of the interwell seismic velocity field.
16. Repeat steps 4–15, using the improved interwell seismic velocity field for raytracing.
17. Repeat steps 4–16 until an adequate level of accuracy is obtained for the interwell seismic velocity field.

It should be understood that the invention is not to be unduly limited to the foregoing which has been set forth for illustrative purposes. Various modifications and alternatives will be apparent to those skilled in the art without departing from the true scope of the invention, as defined in the following claims.

We claim:

1. A method for simulating crosswell seismic data for the subterranean region between a first well and a second well, said method comprising the steps of:

(a) locating at least one seismic source on the surface of the earth substantially in line with, but not between, said first well and said second well, said seismic source being closer to said first well than to said second well;

(b) locating a plurality of vertically spaced apart seismic receivers in said first well;

(c) locating at least one seismic receiver in said second well;

(d) activating said seismic source to generate a seismic signal;

(e) recording the actual arrival time of said seismic signal at each of said first well and second well seismic receivers;

(f) assuming a seismic velocity field for the subterranean region between said first well and said second well;

(g) for each second well seismic receiver, calculating a plurality of estimates of the seismic signal travel time from said seismic source to said second well seismic receiver, each of said estimates being the sum of (1) the actual travel time of said seismic signal from said seismic source to a selected first well seismic receiver, and (2) the theoretical travel time of said seismic signal from said selected first well seismic receiver to said second well seismic receiver based on said assumed velocity field;

(h) for each second well seismic receiver, selecting the shortest of said plurality of estimates of the seismic signal travel time;

(i) comparing said selected estimate of the seismic signal travel time with said actual arrival time of said seismic signal at said second well seismic receiver; and (j) if said selected estimate of the seismic signal travel time and said actual arrival time are not approximately equal for all second well seismic receivers, revising said assumed velocity field and repeating steps (g) through (j) until said selected estimate of the seismic signal travel time and said actual arrival time are approximately equal for all second well seismic receivers.

2. The method of claim 1, wherein said seismic source is a marine seismic source located in a body of water.

3. The method of claim 1, wherein said seismic source is buried a distance below the surface of the earth so that said seismic signal is generated below the weathered upper layers of earth.

4. The method of claim 1, wherein said first well and second well seismic receivers are intra-tubing hydrophones installed in the production tubing in said first and second wells.

5. The method of claim 1, wherein a plurality of vertically spaced apart seismic receivers are located in said second well.

6. The method of claim 1, wherein said seismic signal is a pressure wave.

7. The method of claim 1, wherein said seismic signal is a shear wave.

8. The method of claim 1, wherein said first and second wells are substantially vertical wells.

9. The method of claim 1, wherein at least one of said first and second wells is a deviated well, said deviation lying substantially in the plane defined by said first and second wells.

10. A method for simulating crosswell seismic data for the subterranean region between a first well and a second well, said method comprising the steps of:

(a) locating a plurality of vertically spaced apart seismic receivers in each of said first and second wells;

(b) generating a first seismic signal at a surface location substantially in line with, but not between, said first and second wells, and closer to said first well than to said second well;

(c) recording the actual arrival time of said first seismic signal at each of said first well and second well seismic receivers;

(d) for each second well seismic receiver, calculating a plurality of estimates of the seismic signal travel time from said surface location to said second well seismic receiver, each of said estimates being the sum of (1) the actual arrival time of said first seismic signal at a selected one of said first well seismic receivers and (2) the theoretical seismic signal travel time from said selected first well seismic receiver to said second well seismic receiver based on an assumed interwell seismic velocity field;

(e) for each second well seismic receiver, selecting the shortest of said estimates of the seismic signal travel time from said surface location to said second well seismic receiver and comparing said selected estimate with said actual arrival time of said first seismic signal at said second well seismic receiver; and (f) if said selected estimate is not approximately equal to said actual arrival time at each of said second well seismic receivers, adjusting said assumed interwell seismic velocity field and repeating steps (d) and (e) until said selected estimate is approximately equal to said actual arrival time at each of said second well seismic receivers.

11. The method of claim 10, said method further comprising the steps of:

(g) generating a second seismic signal at a second surface location substantially in line with, but not between, said first and second wells, and closer to said second well than to said first well;

(h) recording the actual arrival time of said second seismic signal at each of said first and second well seismic receivers;

(i) for each first well seismic receiver, calculating a plurality of approximations of the seismic signal travel time from said second surface location to said first well seismic receiver, each of said approximations being the sum of (1) the actual arrival time of said second seismic signal at a selected one of said second well seismic receivers and (2) the theoretical seismic signal travel time from said selected second well seismic receiver to said first well seismic receiver based on said assumed interwell seismic velocity field;

(j) for each first well seismic receiver, selecting the shortest of said approximations of the seismic signal travel time from said second surface location to said first well seismic receiver and comparing said selected approximation with said actual arrival time of said second seismic signal at said first well seismic receiver; and (k) if said selected approximation is not approximately equal to said actual arrival time of said second seismic signal at each of said first well seismic receivers, adjusting said assumed interwell seismic velocity field and repeating steps (i) and (j) until said selected approximation is approximately equal to said actual arrival time of said second seismic signal at each of said first well seismic receivers.

12. The method of claim 11, wherein said first and second seismic signals are generated by a marine seismic source located in a body of water.

13. The method of claim 11, wherein said first and second seismic signals are generated by seismic sources buried a distance below the surface of the earth so that said seismic signals are generated below the weathered upper layers of earth.

14. The method of claim 11, wherein said first well and second well seismic receivers are intra-tubing hydrophones installed in the production tubing in said first and second wells.

15. The method of claim 11, wherein said first and second seismic signals are pressure waves.

16. The method of claim 11, wherein said first and second seismic signals are shear waves.

17. A method for determining the interwell seismic velocity field for the subterranean region between a first well and a second well, said method comprising the steps of:

(a) locating a seismic source on the surface of the earth substantially in line with, but not between, said first well and said second well, said seismic source being closer to said first well than to said second well;

(b) locating a plurality of vertically spaced apart seismic receivers in said first well and at least one seismic receiver in said second well;

(c) activating said seismic source to generate a seismic signal;

(d) recording the actual arrival time of said seismic signal at each of said first well and second well seismic receivers;

(e) using Fermat's principle and an assumed interwell seismic velocity field to calculate a theoretical estimate of the arrival time for said seismic signal at each of said second well seismic receivers;

(f) comparing said theoretical estimate of the arrival time with said actual arrival time for each of said second well seismic receivers; and (g) if said theoretical estimate of the arrival time is not approximately equal to said actual arrival time for each of said second well seismic receivers, revising said assumed interwell seismic velocity field and repeating steps (e), (f), and (g).

18. The method of claim 17, wherein said seismic source is a marine seismic source located in a body of water.

19. The method of claim 17, wherein said seismic source is buried a distance below the surface of the earth so that said seismic signal is generated below the weathered upper layers of earth.

20. The method of claim 17, wherein a plurality of vertically spaced apart seismic receivers are located in said second well.

21. The method of claim 17, wherein said seismic signal is a pressure wave.

22. The method of claim 17, wherein said seismic signal is a shear wave.

23. A method for determining the interwell seismic velocity field for the subterranean region between two wells, said method comprising the steps of:

(a) locating a seismic source on the surface of the earth substantially in line with, but not between, said two wells;

(b) locating a plurality of vertically spaced apart seismic receivers in each of said wells;

(c) activating said seismic source to generate a seismic signal; (d) recording the actual arrival time of said seismic signal at each of said seismic receivers;

(e) using Fermat's principle and an assumed interwell seismic velocity field to calculate a theoretical estimate of the arrival time for said seismic signal at each of said second well seismic receivers;

(f) comparing said theoretical estimate of the arrival time with said actual arrival time for each of said second well seismic receivers; and (g) if said theoretical estimate of the arrival time is not approximately equal to said actual arrival time for each of said second well seismic receivers, revising said assumed interwell seismic velocity field and repeating steps (e), (f), and (g).

24. The method of claim 23, wherein said seismic source is a marine seismic source located in a body of water.

25. The method of claim 23, wherein said seismic source is buried a distance below the surface of the earth so that said seismic signal is generated below the weathered upper layers of earth.

26. The method of claim 23, wherein said seismic signal is a pressure wave.

27. The method of claim 23, wherein said seismic signal is a shear wave.

28. A method for determining a specified parameter for the subterranean region between two wells, said method comprising the steps of:

(a) locating a seismic source at or near the surface of the earth substantially in line with, but not between, said two wells;

(b) locating a plurality of vertically spaced apart seismic receivers in each of said wells;

(c) activating said seismic source to generate a seismic signal;

(d) recording said seismic signal at each of said seismic receivers;

(e) selecting a characteristic of said seismic signal related to said specified parameter and identifying the occurrence of said characteristic in each of said recordings of said seismic signal;

(f) for each second well seismic receiver, using Fermat's principle and the interwell seismic velocity field to determine (1) the raypath having the shortest traveltime from said seismic source to said second well seismic receiver and (2) which of said first well seismic receivers is nearest to said shortest traveltime raypath; and (g) for each second well seismic receiver, comparing said identified occurrences of said seismic signal characteristic from said second well seismic receiver with those from said first well seismic receiver nearest to said shortest traveltime raypath to determine said specified parameter for the subterranean region between said first well seismic receiver and said second well seismic receiver.

29. The method of claim 28, wherein said specified parameter is the interwell seismic velocity field and said characteristic is the initial arrival time of said seismic signal.

30. The method of claim 28, wherein said specified parameter is the interwell absorptiveness and said characteristic is the amplitude of said seismic signal.

31. The method of claim 28, wherein said seismic source is a marine seismic source located in a body of water.

32. The method of claim 28, wherein said seismic signal is a pressure wave.

33. The method of claim 28, wherein said seismic signal is a shear wave.

* * * * *